US008751279B2

(12) United States Patent
Burns

(10) Patent No.: US 8,751,279 B2
(45) Date of Patent: Jun. 10, 2014

(54) SYSTEM AND METHOD FOR PREVENTING THE LAPSE OF A RECURRING EVENT USING ELECTRONIC CALENDAR SYSTEM

(75) Inventor: Anthony G. Burns, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 2480 days.

(21) Appl. No.: 11/135,119

(22) Filed: May 23, 2005

(65) Prior Publication Data

US 2006/0265263 A1 Nov. 23, 2006

(51) Int. Cl.
*G06Q 10/00* (2012.01)
(52) U.S. Cl.
USPC .................. 705/7.16; 705/7.18; 705/7.19
(58) Field of Classification Search
USPC ...................... 705/7.18, 7.19, 7.16
See application file for complete search history.

(56) References Cited

U.S. PATENT DOCUMENTS

| | | | | |
|---|---|---|---|---|
| 5,602,963 | A * | 2/1997 | Bissonnette et al. | 704/275 |
| 5,732,399 | A * | 3/1998 | Katiyar et al. | 705/8 |
| 6,370,566 | B2 * | 4/2002 | Discolo et al. | 709/206 |
| 6,463,463 | B1 | 10/2002 | Godfrey et al. | 709/206 |
| 6,489,950 | B1 | 12/2002 | Griffin et al. | 345/168 |
| 6,675,356 | B1 | 1/2004 | Adler et al. | 715/530 |
| 6,691,111 | B2 | 2/2004 | Lazaridis et al. | 707/6 |
| 7,088,294 | B2 * | 8/2006 | Qi et al. | 343/702 |
| 7,353,194 | B1 * | 4/2008 | Kerker et al. | 705/29 |
| 2001/0049617 | A1 * | 12/2001 | Berenson et al. | 705/8 |
| 2002/0114220 | A1 * | 8/2002 | Cunningham | 368/28 |
| 2003/0061433 | A1 * | 3/2003 | Hall et al. | 711/1 |
| 2003/0154116 | A1 | 8/2003 | Lofton | 705/8 |
| 2003/0220806 | A1 | 11/2003 | Hoffman et al. | 705/1 |
| 2004/0168133 | A1 | 8/2004 | Wynn et al. | 715/541 |
| 2004/0192311 | A1 * | 9/2004 | Koskinen et al. | 455/440 |
| 2005/0102607 | A1 | 5/2005 | Rousselle et al. | 715/234 |
| 2005/0222891 | A1 * | 10/2005 | Chan et al. | 705/9 |
| 2006/0217991 | A1 * | 9/2006 | Blake et al. | 705/1 |
| 2006/0240877 | A1 * | 10/2006 | Filiba et al. | 455/567 |

FOREIGN PATENT DOCUMENTS

| | | | | |
|---|---|---|---|---|
| EP | 1213659 | 6/2002 | ............ | G06F 12/02 |
| WO | 03/007204 | 1/2003 | ............ | G06F 17/60 |
| WO | 03/056789 | 7/2003 | ............ | H04M 1/57 |
| WO | 2004/100586 | 11/2004 | ............ | H04Q 7/38 |

OTHER PUBLICATIONS

Mastering Microsoft Office 97/ Moseley, Boodey, Professional Edition $2^{nd}$. ISBN 0782119255.*
Absolute Beginner's Guide to Microsoft® Office 2003 ISBN-10: 0-7897-2967-9 Jim Boyce.*

(Continued)

*Primary Examiner* — Mark A Fleischer
(74) *Attorney, Agent, or Firm* — Allen, Dyer, Doppelt, Milbrath & Gilchrist, P.A.

(57) ABSTRACT

A system and method for preventing the lapse of a recurring event includes an electronic calendar program having the capability of establishing a recurring event with a predetermined end date. A processor is operative for notifying an organizer of the event at a predetermined time of the end date for the recurring event and permitting the organizer to modify the end date of the recurring event if the event is to continue. The electronic calendar program and processor is operative in a mobile wireless communications device that includes a housing and radio frequency (RF) transceiver contained within the housing such that notifications of the new end date can be transmitted to and received by attendees of the event, including any changed meeting information.

18 Claims, 8 Drawing Sheets

(56) References Cited

OTHER PUBLICATIONS

Developing Calendar Visualizers for the information Visualizer, Jock D. Mackinlay, 1994.*

Absolute Beginners Guide to Microsoft® Office 2003 ISBN-10: 0-7897-2967-9 Jim Boyce.*

"*ACES User Manual*," Department of Social and Health (Internet), XP002341558, Jun. 1, 2001, 1 page.

"*BlackBerry 7100 Series User Guide Version 4.0*," Research in Motion Limited (Internet) XP002341557, May 10, 2005, 6 pages.

US 5,749,074, 5/1998, Kasso et al. (withdrawn).

"*BlackBerry*"Wikipedia, retrieved from Internet Archive's "*WayBack Machine*," Apr. 20, 2005, 6 pages.

RFC 2445; "*Internet Calendaring and Scheduling Core Object Specification (iCalendar)*", The Internet Society, retrieved from Internet, 1998, pp. 117-125.

* cited by examiner

| May 12, 2003 | 12:25 | ‹S |M|T|W|T|F|S› |
|---|---|---|---|

9:00a Upcoming Projects  🔔⟲
10:00a
|11:00a| Performance Review [Room 2]  🔔

|12:00p|
1:00p
2:00p
3:00p Interview [Boardroom A]  🔔
4:00p
5:00p

*FIG. 3*

May 12, 2003     12:21        ◁▷
Mon, May 12, 2003
|1:00p| Meet with suppliers  🔔
Tue, May 13, 2003                🔔⟲
10:00a Status Update [Meeting Room 2]
2:00p Performance Review [Room A]  🔔
Wed, May 14, 2003
11:30a Project Review [Meeting Room 4]  🔔
Tue, May 20, 2003
10:00a Status Update [Meeting Room 2]  🔔⟲
Tue, May 27, 2003
10:00a Status Update [Meeting Room 2]  🔔⟲

*FIG. 4*

```
New Appointment
Subject: Status Review
Location: Room B
```
▭ All Day Event

| | |
|---|---|
| Start: | Mon, May 12, 2003 1:00 PM |
| End: | Mon, May 12, 2003 2:00 PM |
| Duration: | 1 Hour 0 Mins. |
| Time Zone: | Eastern Time (-5) |
| Reminder: | 15 Min. |

Recurrence: None
No Recurrence:

Notes:

FIG. 7

Reinstate Recurrence?
Yes            No
End Date    5-14-05

FIG. 8

Edit Recurrence?
Yes        No

FIG. 9

SYSTEM AND METHOD FOR PREVENTING THE LAPSE OF A RECURRING EVENT USING ELECTRONIC CALENDAR SYSTEM

FIELD OF THE INVENTION

This application relates to the field of managing recurring events, and more particularly, to establishing and managing information relating to a recurring event established within an electronic calendar program.

BACKGROUND OF THE INVENTION

Electronic calendar systems are becoming more popular and in combination with a mobile wireless communications device can include messaging capability for establishing a recurring event, such as appointments or meetings with a predetermined end date. An organizer may set the event information parameters, including time, duration and location of the event, for example, the meeting, which will recur periodically for a set period of time and have a predetermined end time. Attendees of the event can be notified of the event information and end date of the recurring event through a notification transmitted from a server or mobile wireless communications device. Communication devices and systems operative with calendar programs and/or for pushing calendar event messages are disclosed in commonly assigned U.S. Pat. Nos. 6,463,463 and 6,489,950 and published international PCT application WO 03/056789 and WO 2004/100586.

The use of mobile wireless communications devices with messaging and associated calendar programs are becoming more popular each day. These calendar programs permit the establishment and managing of events, including any appointments and meetings, and a user interface to view day, agenda, week or month formats. Many of these calendar programs allow the event, i.e., the appointment or meeting, to recur regularly such as on a daily, weekly or monthly basis where the frequency of the event is set through use of a user interface. It is also possible to set the date on which the series of appointments or meetings ends. If an event recurs weekly, the days on which the event recurs can be set.

Typically, recurring events with an end date currently lapse without any notice to an organizer of this recurring event. This can lead to an inability to continue to hold the event because of room restrictions, attendee conflicts, or simply the inconvenience of having to reinstate the event, for example, an arranged meeting, with one or more attendees.

BRIEF DESCRIPTION OF THE DRAWINGS

Other objects, features and advantages will become apparent from the detailed description which follows, when considered in light of the accompanying drawings in which:

FIGS. 3-6 are screen shots of a calendar program that can be displayed on a mobile wireless communications device such as shown in FIGS. 1 and 2, and showing the respective day, agenda, week and month format.

FIG. 7 is a screen shot showing a new event, i.e., appointment screen, which can be used for setting a recurring event.

FIG. 8 is a screen shot showing a notification concerning the recurring event and indicating whether the recurring event should be reinstated.

FIG. 9 is a screen shot indicating whether the event information for the recurring event should be changed through editing basic parameters such as time, duration or location of the event.

DETAILED DESCRIPTION OF THE PREFERRED EMBODIMENTS

Figure 1:
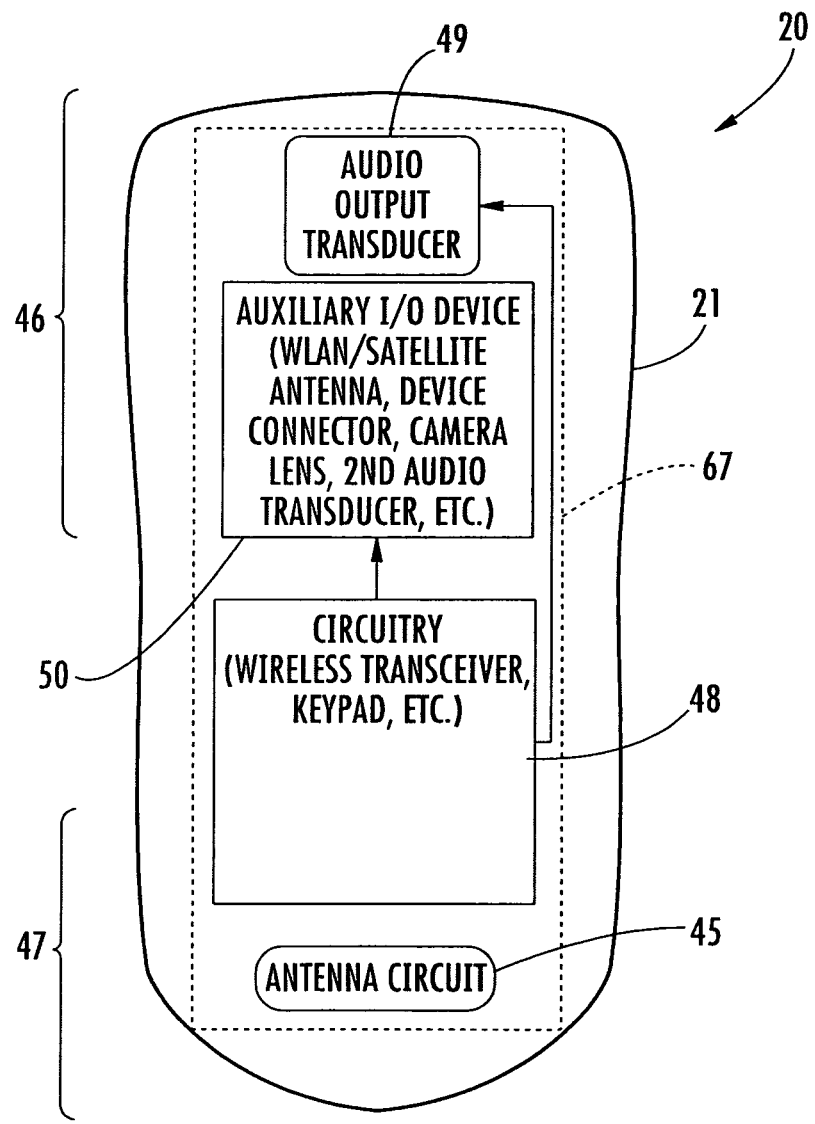
FIG. 1 is a schematic block diagram of an example of a mobile wireless communications device that can be used and illustrating certain internal components thereof.

Different embodiments will now be described more fully hereinafter with reference to the accompanying drawings, in which preferred embodiments are shown. Many different forms embodiments can be used and this description should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

Problems often occur with some calendar functions in which recurring events with an end date currently elapse without any notice to the organizer. This can lead to an inability to continue to hold the event because of room restrictions or other problems. Also, there could be an inconvenience in having to reinstate the event and having all the original recipients of a recurring message and event notice obtain the reinstated event notices. An organizer can now be informed of all recurrences of an event that were done within a certain period of time or "x" dates of the last occurrence, and allow the user to modify the end date, if necessary, in an efficient manner. This could occur by prompting a user to enter Yes to modify the end date and bring up a menu for changing event information. It should be understood that the term "event" encompasses the term "meeting" and the term "appointment" as well as other terms typically used in electronic calendar or messaging systems that establish events such as meetings and appointments.

A system and method in one example can be incorporated for use on a wireless mobile communications device. An electronic calendar program has the capability of establishing a recurring event, i.e., an appointment or meeting with a predetermined end date. A processor is operative for notifying an organizer of the event at a predetermined time of the end date for the recurring event and permitting the organizer to modify the end date of the recurring event if the meeting is to continue. Of course, the term "event" encompasses the terms "meeting" and the term "appointment" as well as other terms typically used in electronic calendar or messaging systems that establish events such as meetings and appointments.

In one example, the processor is operative for permitting the organizer to modify event information, which could comprise one of time, duration or location of the event. The user interface is preferably established such as on an LCD of a wireless mobile communications device for entering information for establishing the recurring event and permitting the organizer to modify the end date.

The system could also be operative for notifying the organizer of the recurring event when all recurrences of the event are done within a predetermined number of days of the last occurrence. The notification could be established by a processor contained within a housing of a wireless mobile communications device and operative with a radio frequency (RF) transceiver contained within the housing and operative with a calendar program. Alternatively, the notification could be transmitted from a central server in a wireless or wired manner.

A method is also set forth for preventing the lapse of a recurring event, which comprises establishing within an electronic calendar program a recurring event having a predetermined end date; notifying an organizer for the event at a predetermined time of the end date for the recurring event; and modifying the end date of the recurring event if the event is to continue.

Figure 2:
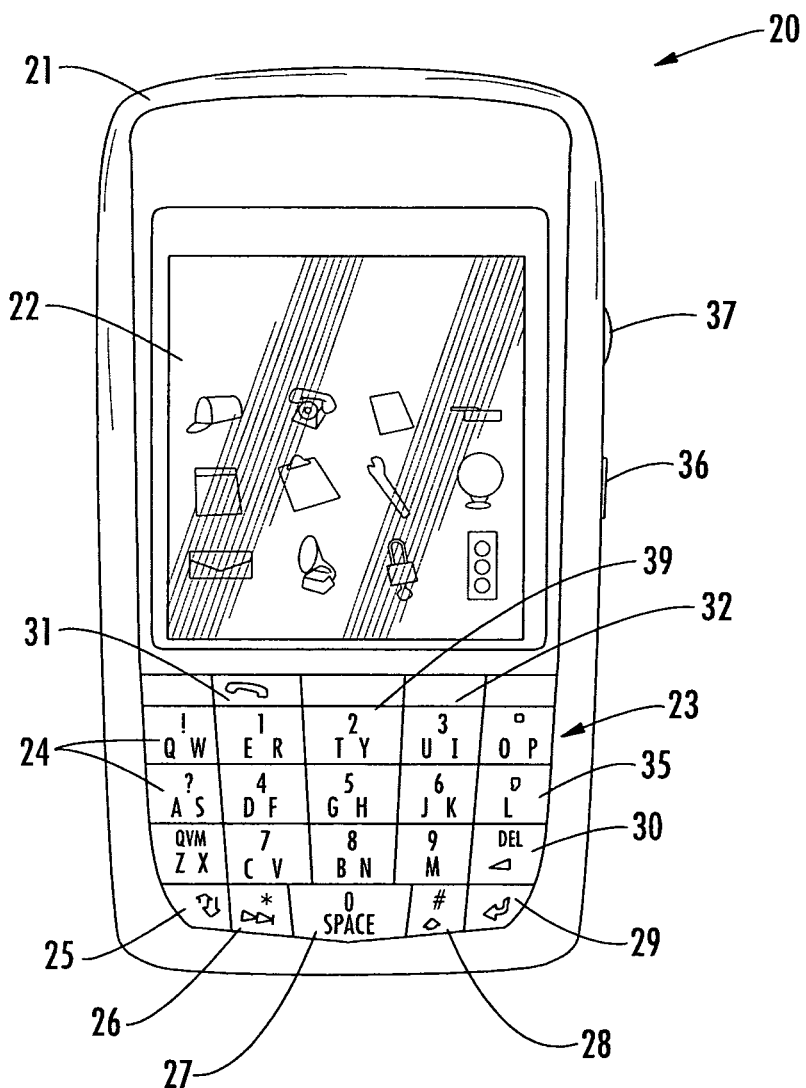
FIG. 2 is a front elevation view of the mobile wireless communications device of FIG. 1.

Referring initially to FIGS. 1 and 2, an example of a mobile wireless communications device, such as a mobile cellular device 20, that can be used is first described. The cellular device 20 illustratively includes a housing 21 having an upper portion 46 and a lower portion 47, and a dielectric substrate 67, such as a printed circuit board (PCB) substrate, for example, carried by the housing. The term circuit board 67 as used hereinafter can refer to any dielectric substrate, PCB, ceramic or other structure for carrying signal circuits within a mobile wireless communications device. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), audio and power circuitry, including any keyboard circuitry. It should be understood that keyboard circuitry could be on a separate board, etc., as will be appreciated by those skilled in the art, and as will be discussed further below. A battery (not shown) is also preferably carried by the housing 21 for supplying power to the circuitry 48.

Furthermore, an audio output transducer 49 (e.g., a speaker) is carried by an upper portion 46 of the housing 21 and connected to the circuitry 48. One or more user input interface devices, such as a keypad 23 (FIG. 2), is also preferably carried by the housing 21 and connected to the circuitry 48. Other examples of user input interface devices include a scroll wheel 37 and a back button 36. Of course, it will be appreciated that other user input interface devices (e.g., a stylus or touch screen interface) may be used in other embodiments.

An antenna 45 is positioned at the lower portion 47 in the housing and can be formed as a pattern of conductive traces forming an antenna circuit that physically forms the antenna and connected to the circuitry 48 on the main circuit board 67. The antenna could be formed on an antenna section that extends from the circuit board at the lower portion of the housing. By placing the antenna 45 adjacent the lower portion 47 of the housing 21, this advantageously increases the distance between the antenna and the user's head when the phone is in use to aid in complying with applicable SAR requirements.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and is typically held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22 carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) are arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and"#" upon first actuating the alternate function key 25, as noted above, this set of keys defines a standard telephone keypad layout, as would be found on a traditional touch-tone telephone, as will be appreciated by those skilled in the art.

Accordingly, the mobile cellular device 20 may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well.

To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using phone features, managing phone call logs, setting phone options, and viewing phone information. A browser could allow the browsing of web pages and configuring the browser, including bookmarks and browser options. Other applications could include the task, memo pad, calculator, alarm and games as well as handheld options with various references.

The managing of events is especially adapted for use with a calendar program, as one non-limiting example. It should be understood that the term calendar program is broad enough to encompass any type of messaging or appointment/meeting program that allows an organizer to establish an event, for example, an appointment or meeting. The term appointment is used in some of the screen shots as an example of an event. Although the term calendar program is used, it should be understood that the term is broad enough to encompass any type of date setting and event setting function commonly used in electronic computer programs. It should also be understood that the calendar program is operative for pushing calendar event messages from a host system to a mobile data communications device and in reverse. The described system could be operative with systems such as described in commonly assigned and incorporated by reference '463 patent identified above.

Figure 5:
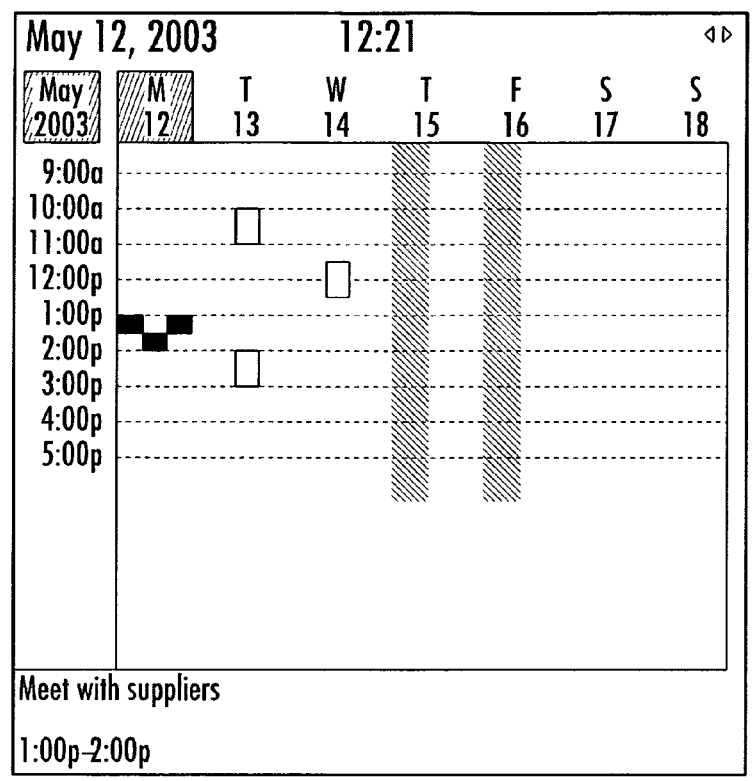
Figure 6:
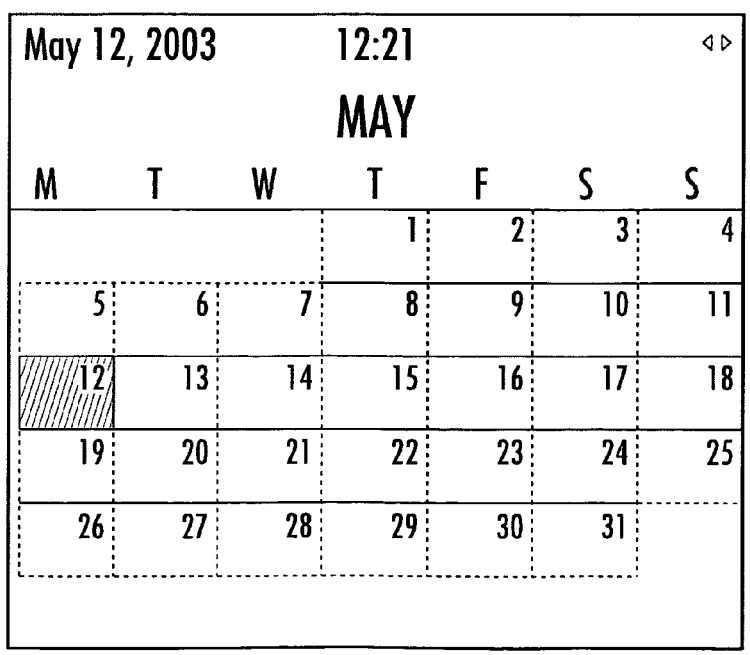

FIGS. 3-6 show screen shots for a non-limiting example of a type of calendar format in a calendar program that could be used in one embodiment. FIG. 3 shows a day format. FIG. 4 shows an agenda format. FIG. 5 shows a week format. FIG. 6 shows a month format.

In the device shown in FIGS. 1 and 2, it is possible to change the calendar format. On a Home screen, a user clicks a Calendar icon and the calendar appears. The user clicks the track wheel and a menu appears. The user selects one of the following options: (a) to view a schedule for one day, the user clicks View Day; (b) to view a list of appointments and meetings, grouped by day, the user clicks View Agenda; (c) to view a schedule for one week, the user clicks View Week; and (d) to view a schedule for one month, the user clicks View Month. To change days quickly in Day format, the user scrolls to the navigation bar and clicks a day.

It is also possible to view the current date. On a Home screen, a user clicks the Calendar icon and L the calendar appears. The user clicks the track wheel and a menu appears. The user clicks Today and the current date appears.

It is also possible to view a specific date. On the Home screen, a user clicks the Calendar icon and the calendar appears. The user clicks the track wheel and a menu appears. The user clicks Go to Date, and a dialog box appears. In the Go to Date field, the user presses the Space key until the preferred options appear. The user clicks the track wheel and the date appears.

It is possible to view the next or previous date. On the Home screen, the user clicks the Calendar icon and the calendar appears. The user clicks the track wheel, and a menu appears. The user can select one of the following options as non-limiting examples:

| Format | Option |
| --- | --- |
| Day | To view that day in the next week, click Next Week; to view that day in the previous week, click Prev Week. |
| Agenda | To view the next day on which you have an appointment or meeting, click Next Day; to view the previous day on which you have an appointment or meeting, click Prev Day. |
| Week | To view the next week, click Next Week; to view the previous week, click Prev Week. |
| Month | To view the next month, click Next Month; to view the previous month, click Prev Month; to view that month in the next year, click Next Year; to view that month in the previous year, click Prev Year. |

It is also possible to manage events such as appointments and meetings. In one non-limiting example, an appointment can be considered a scheduled amount of time in the calendar. A meeting can be considered an appointment to which contacts are invited. For purposes of description, the term event will encompass appointments and meetings. To manage events, especially meetings, on the handheld shown in FIGS. 1 and 2, the handheld is integrated with an email account and includes wireless calendar synchronization.

A first step is to create an event, i.e., the appointment or meeting. For example, the Home screen, a user clicks the Calendar icon and the calendar appears. The user clicks the track wheel and a menu appears. The user clicks New and a New Appointment screen appears, for example as shown in FIG. 7. In the following fields, the user can type appointment information: (a) Subject: a user types the subject of the appointment; (b) Location: a user types the location of the appointment.

Preferred options appear when a Space key is pressed for example, the fields listed in the table below, which also set forth a description and default. The description and default typically would not be displayed on an LED of the wireless device, but are only set forth in the table below for description purposes.

| Field | Description | Default |
|---|---|---|
| All Day Event | Set whether the appointment occupies a full day. | Cleared |
| Start | Set the date and time when the appointment starts. | Selected date and time |
| End | Set the date and time when the appointment ends. If a user modifies this field, the Duration field reflects the change. The appointment must start and end on the same date. | 30 minutes after start time |
| Duration | Set the length of the appointment. If a user modifies this field, the End field reflects the change. | 0 Hours 30 Mins |
| Time Zone | Set the time zone in which the appointment occurs. | Eastern Time |
| Reminder | Set the amount of time in advance your handheld notifies you of the appointment. If a user does not want to be notified, set this field to None. | 15 Min |
| Recurrence | Set whether the user wants the appointment to recur regularly, such as on a daily, weekly, or monthly basis. | None |
|  | Every: Set the frequency of the appointment. | 1 |
|  | End: Set the date on which the series of appointments ends. Days: If your appointment recurs weekly, set the days on which the appointment recurs. Relative Date: If your appointment recurs monthly or yearly, you can set whether the appointment recurs on the exact data or on the relative dates. For example, you can set the appointment to recur on the 28th of each month (exact date) or on the last Monday of each month (relative date). | Never |

In the Notes field, a user can type any additional information for the appointment. The user clicks the track wheel and a menu appears. The user selects one of the following options: a) to save the appointment, the user clicks Save, b) to create a meeting, the user proceeds to the next step. The user clicks Invite Attendee and the Select Address screen appears. The user clicks a contact and a menu appears, and the user clicks Invite. To invite more contacts, the previous 3 steps can be repeated. Because the user is already registered as the person who created the meeting, the user is not invited of course. The user clicks the track wheel and a menu appears. The user clicks Save and a meeting invitation is sent. Any responses to the meeting invitation are received in the Messages application.

The described calendar function allows a user to set whether an event, i.e., the appointment or meeting, is to recur regularly, such as on a daily, weekly or monthly basis. The program in accordance with this non-limiting example allows the frequency of the appointment to be established and the date in which the series of appointments ends. If an appointment recurs weekly, the weekday or weekdays on which the appointment recurs is possible. Thus a possible setting would be appointment recurs on the exact date or on the relative date.

Problems may especially occur with recurring events having an end that currently elapses without any notice to the organizer or user who established the event. This can lead to an inability to continue to hold events because of room restrictions or associated problems. This could also include an inconvenience in having to reinstate the event.

The embodiments as non-limiting examples inform the organizer or user who organized the event that all recurrences of the event were done within a preset or (x) days of the last recurrence. They also allow a user to modify the end date if necessary in an efficient manner. This can be accomplished through a pop-up menu or an alarm.

For example, in the embodiment showing the screen shots of FIGS. 8 and 9, a question could be displayed on the display of the mobile wireless communications device asking the organizer or user if the end date of the recurring event is to be modified. The display could also give a reminder as to the end date as shown in FIG. 8. If a Yes is selected, a screen can be used for establishing the recurring event, and could be a simplified menu that allows only the editing of the end date, which is modified. Another screen shot could query whether the recurring event information should be edited. This edited information could include the time, duration or location of the event. If a more simplified menu is used to reinstate the recurring event by modifying the end date, then a more detailed menu, such as shown in FIG. 7, could be displayed for modifying the event information. This information would then be transmitted to a host server or other means for transmitting notifications to attendees, indicating a new end date for the recurring event and if there were edits and modifications to event information, the new changed information, such as the time, duration or location of the event.

Figure 10:
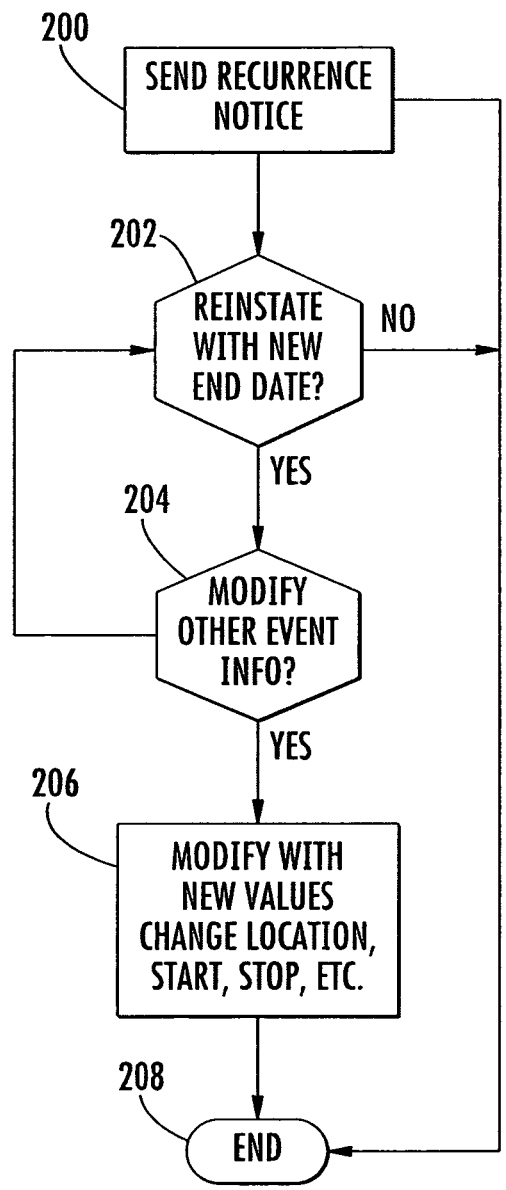
FIG. 10 is a high level flowchart showing the system and method of preventing the lapse of a recurring event such as using an electronic calendar program.

FIG. 10 shows a high level flowchart as an example of one non-limiting embodiment. As shown in block 200, a recurrence notice is sent to the organizer of the event, such as through a recurrence notice as shown in FIG. 8. As shown at block 202, the organizer decides whether to reinstate the event with the new end date. If no, then the program ends. If yes, then shown at block 204 the organizer decides whether to edit other event information, such as the location or time of the event. If no, the program will allow the organizer to reinstate with the new end date since the organizer had answered "Yes" whether the end date is to be modified at block 202. If yes, then the event information is edited with new values and the program ends (block 208).

It should be understood that in this type of calendar program, it is possible to set events such as appointments/meetings quickly. On the Home screen, a user could click the Calendar icon and the calendar appears. When the calendar is in day format, the start time and the subject of an appointment is typed. A location in parentheses can be set. The track wheel can be rolled to change the end time of the appointment and the appointment is saved.

It is also possible to open an appointment/meeting when the calendar is in Day, Week, or Agenda format. The user clicks an appointment and a menu appears. The user clicks Open, and if the appointment recurs, a dialog box appears. To open all occurrences of the appointment, the user clicks Open the series, and opens only the selected appointment, the user clicks Open for this occurrence. The details of the meeting appear.

It is also possible to open an appointment/meeting from a Messages screen and click a meeting invitation or response.

Different details of the meeting can appear in an open attachment. Any meeting invitations can appear as messages on a Messages screen, and it is possible to accept or decline a meeting invitation. A Messages icon can be clicked and details of a meeting can appear after opening a menu. Different options can be selected such as selecting the meeting without sending comments, declining the meeting without sending comments, accepting the meeting and sending comments, and declining the meeting and sending comments. This can be established through a menu screen.

In the calendar program, appointments/meetings could be edited when the calendar is in a Day, Week, or Agenda format. A dialog box could indicate if the appointment or meeting recurs. It is possible to edit all occurrences of the appointment and open a series. Only selected appointments could be edited if desired. Appointment details could occur in a separate screen and the appointment or meeting edited. Different options could be selected through a menu such as saving edit appointments or meetings or editing the contacts that are invited to a meeting. These could be accepted or declined. To invite a new contact, it is possible to click another menu to invite an attendee or replace one contact with another contact or revoke an invitation to contact. These could be saved of course.

It is also possible to delete an appointment/meeting using the calendar program in a Day, Week, or Agenda format. The appointment menu can appear and the information can be deleted. For example, if the appointment or meeting occurs once, then that could be deleted. If the appointment/meeting recurs, to delete all occurrences of the appointment, the series should be deleted, and to delete only a selected appointment then only the one occurrence can be deleted. If a meeting is deleted that was created by the user, a send cancellation is sent forth to attendees. Different calendar options can be set and different options, including enabling a quick entry to allow appointments to be added quickly in a day format, an initial view for setting a format when the calendar opens, a default reminder to set the amount of time before an appointment/meeting, the confirming of a delete, the setting of a time at which a daily schedule starts or ends with a start of day or end of day field, and the setting of a day on which a weekly schedule begins such as a first day of the week field.

An example of a hand-held mobile wireless communications device 1000 that may be used is further described in the example below with reference to FIG. 11. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 11:
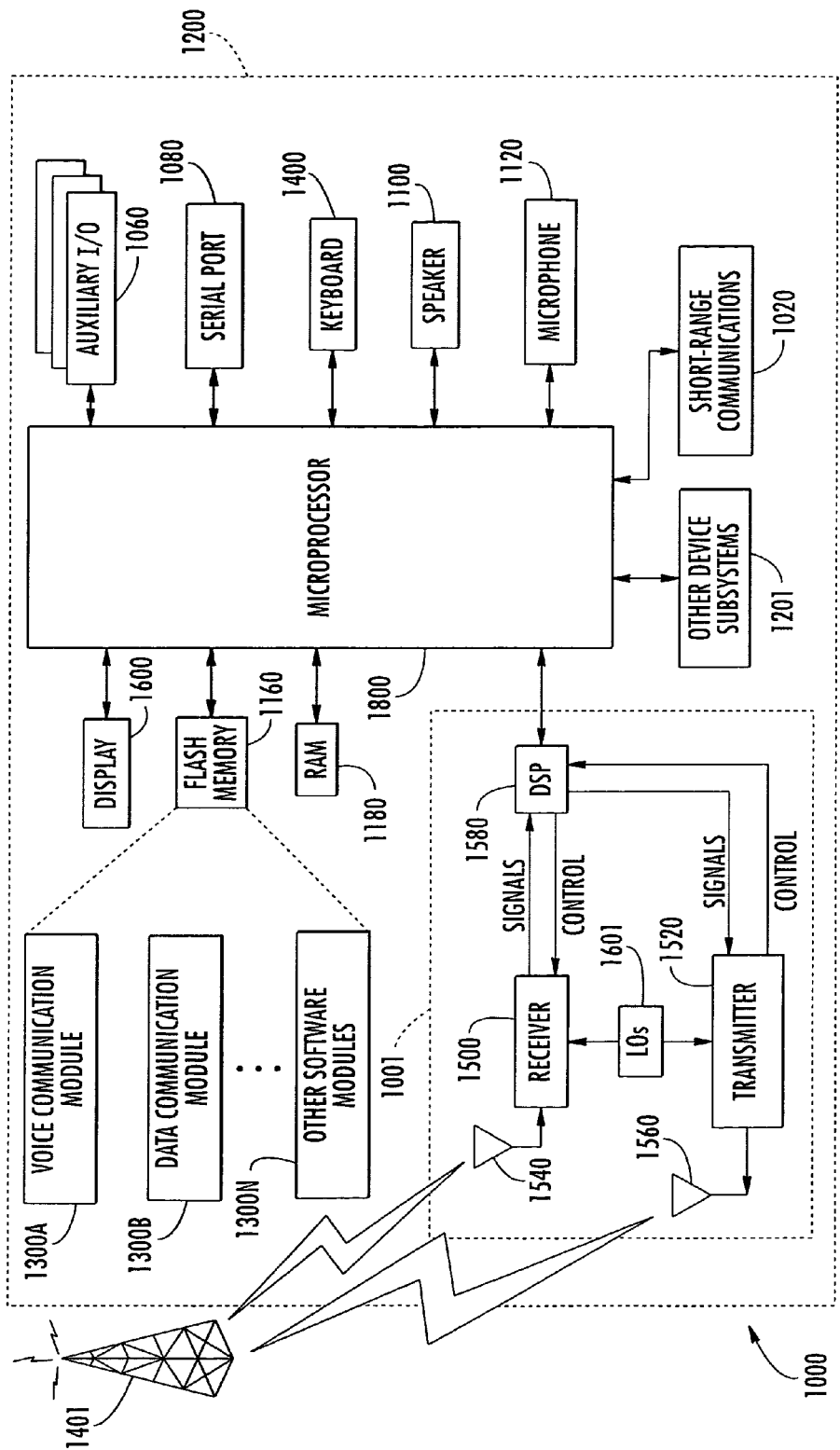
FIG. 11 is a schematic block diagram of an exemplary mobile wireless communications device.

In addition to the processing device 1800, other parts of the mobile device 1000 are shown schematically in FIG. 11. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the description is not to be limited to the specific embodiments disclosed, and that modifications and embodiments are intended to be included within the scope of the appended claims.

That which is claimed is:

1. A system for preventing the elapse of a recurring event comprising:
   a memory containing a recurring event established with a predetermined end date;
   a user interface; and
   a processor connected to the memory and user interface and configured to cause presentation on the user interface of a notification regarding an impending lapse of the recurring event at a predetermined time of the predetermined end date for the recurring event, the processor being further configured to modify the end date of the recurring event according to an indication received by the processor from the user interface when the recurring event is to continue, wherein the user interface is further configured to:
   present a reminder regarding the impending lapse at least one of before and during the predetermined end date, and prompt regarding prevention of the impending lapse of the recurring event upon a last recurrence of the recurring event, the indication to modify the end date being received by the processor from the user interface according to a user input relative to at least one of the reminder and the prompt.

2. A system according to claim 1, wherein the processor is configured to modify event information.

3. A system according to claim 2, wherein the event information comprises one of time, duration or location of the event.

4. A system according to claim 1, and further comprising a radio transceiver connected with said processor for transmitting notifications to attendees indicating a new end date for the recurring event.

5. A system according to claim 1, wherein the processor is configured to notify a device associated with a user that established the recurring event when all recurrences of the event were done within a predetermined number of days of the last occurrence.

6. A wireless handheld communications device comprising:
   a housing;
   a radio frequency (RF) transceiver contained within the housing;
   a user interface;
   a memory containing a recurring event established with a predetermined end date;
   a processor contained within the housing and operative with the RF transceiver, user interface and memory; and
   said processor being configured to cause presentation on the user interface of a notification regarding an impending lapse of the recurring event at a predetermined time of the predetermined end date for the recurring event, the processor being further configured to modify the end date of the recurring event according to an indication received by the processor from the user interface when the recurring event is to continue, wherein the user interface is further configured to:
   present a reminder regarding the impending lapse at least one of before and during the predetermined end date, and
   prompt regarding prevention of the impending lapse of the recurring event upon a last recurrence of the recurring event, the indication to modify the end date being received by the processor from the user interface according to the user input relative to at least one of the reminder and the prompt.

7. A wireless handheld communications device according to claim 6, wherein the processor is configured to permit a device associated with a user that established the recurring event to modify event information comprising one of time, duration, or location of the event.

8. A wireless handheld communications device according to claim 7, wherein said processor is configured to notify a device associated with a user that established the event when all recurrences of the event were done within a predetermined number of days of the last occurrence.

9. A method for preventing the elapse of a recurring event, which comprises:

inputting data to a memory of a communications device about a recurring event established with a predetermined end date;

processing the data within a processor of the communications device to present on a user interface of the communications device a notification regarding an impending lapse of the recurring event at a predetermined time of the predetermined end date for the recurring event;

modifying data regarding the end date of the recurring event by inputting new data to the processor from the user interface when the recurring event is to continue;

presenting a reminder on the user interface regarding the impending lapse at least one of before and during the predetermined end date; and displaying a prompt via the user interface regarding prevention of the upcoming lapse of the recurring event upon a last recurrence of the recurring event, the indication to modify the end date being received by the processor from the user interface according to the user input relative to at least one of the reminder and the prompt.

10. A method according to claim 9, which further comprises notifying a device associated with a user that established the recurring event when all recurrences of the event were done within a predetermined number of days of the last occurrence.

11. A method according to claim 9, which further comprises notifying attendees of a new end date for the recurring event.

12. A method according to claim 11, which further comprises wirelessly transmitting a notification to each attendee indicating a new end date for the recurring event.

13. A method according to claim 9, which further comprises establishing the recurring event by entering values into the user interface operative with the electronic calendar system.

14. A method according to claim 9, which further comprises notifying device associated with a user that established the recurring event and/or invitee of the end date by wirelessly transmitting a notification to a wireless, handheld communications device.

15. A method according to claim 9, which further comprises modifying the end date and changing meeting information if the recurring event is to continue with different meeting information.

16. A method according to claim 15, which further comprises notifying attendees of the new end date and different meeting information.

17. A method according to claim 16, which further comprises transmitting a notification to each attendee indicating a new end date and changed meeting information.

18. A method according to claim 15, wherein the step of changing meeting information includes changing one of the time, duration, or location of the meeting.

* * * * *

UNITED STATES PATENT AND TRADEMARK OFFICE
CERTIFICATE OF CORRECTION

| | | |
|---|---|---|
| PATENT NO. | : 8,751,279 B2 | Page 1 of 1 |
| APPLICATION NO. | : 11/135119 | |
| DATED | : June 10, 2014 | |
| INVENTOR(S) | : Burns | |

It is certified that error appears in the above-identified patent and that said Letters Patent is hereby corrected as shown below:

In the Claims:

Column 14, Line 9          Insert: --a-- between "notifying" and "device"

Signed and Sealed this
Ninth Day of September, 2014

Michelle K. Lee
*Deputy Director of the United States Patent and Trademark Office*